United States Patent
Murayama (10) Patent No.: US 7,467,258 B2
(45) Date of Patent: Dec. 16, 2008

(54) STORAGE VIRTUALIZER AND COMPUTER SYSTEM USING THE SAME

(75) Inventor: Takashi Murayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 259 days.

(21) Appl. No.: 11/277,443

(22) Filed: Mar. 24, 2006

(65) Prior Publication Data
US 2007/0136524 A1    Jun. 14, 2007

(30) Foreign Application Priority Data
Dec. 9, 2005    (JP)    ............................. 2005-355503

(51) Int. Cl.
G06F 12/16    (2006.01)
(52) U.S. Cl. ........................... 711/114; 711/112; 714/5; 714/25
(58) Field of Classification Search ........................ None
See application file for complete search history.

(56) References Cited

U.S. PATENT DOCUMENTS 7,181,578 B1 *    2/2007    Guha et al. .................. 711/154
7,318,138 B1 *    1/2008    Usgaonkar et al. .......... 711/163
2006/0112251 A1 *    5/2006    Karr et al. .................... 711/170

FOREIGN PATENT DOCUMENTS

| JP | 4-98439 | 3/1992 |
| JP | 2000-148655 | 5/2000 |
| JP | 2001-27972 | 1/2001 |
| JP | 2001-154929 | 6/2001 |

* cited by examiner

Primary Examiner—Than Nguyen
(74) Attorney, Agent, or Firm—Staas & Halsey LLP (57) ABSTRACT

The storage virtualizer does not repeatedly switch a path used by a host computer when failure occurs in a path between a physical storage unit and a virtual storage unit. The storage virtualizer comprises: a plurality of targets connectable to the host computer; a unit for connecting at least one physical storage unit to the targets via a plurality of paths; a virtualization unit producing at least one virtual storage unit by at least a part of a storage area of the physical storage unit and allowing the host computer to access to the virtual storage unit, the virtualization unit real-accessing to the physical storage unit via the path corresponding to the target accessed when the access is executed; means for detecting failure of real access to the physical storage via each of the paths; and a target control unit blocking the target corresponding to the failure path, which is detected by the detecting means, with respect to the host computer.

6 Claims, 6 Drawing Sheets

STORAGE VIRTUALIZER AND COMPUTER SYSTEM USING THE SAME

BACKGROUND OF THE INVENTION

The present invention relates to a storage virtualizer, in which a virtual storage unit is constituted by a part or a whole of a storage area of at least one physical storage unit and which is capable of accessing to a host computer, and a computer system using the storage virtualizer.

In a large scale computer system for mass-processing data, a plurality of storage units, e.g., magnetic disk units, are often connected to a host computer, e.g., server computer, by a proper connecting manner, e.g., fiber channels, so as to allow the host computer to flexibly use the storage units.

In the above described computer system, a multipath control method is widely used so as to improve failure resistance of the system. In the multipath control method, one or a plurality of storage units are connected to the host computer by a plurality of paths respectively. In a normal state, the host computer accesses via specific paths (regular paths) connected to the storage units. When failure occurs in the regular path, the host computer accesses via another path (sub path) connected to the storage unit.

By using the multipath control method, even if failure occurs in one path of the storage unit, the host computer can access to the storage unit via another path connected to the storage unit. Therefore, the failure resistance of the system against the path failure can be improved.

Figure 4:
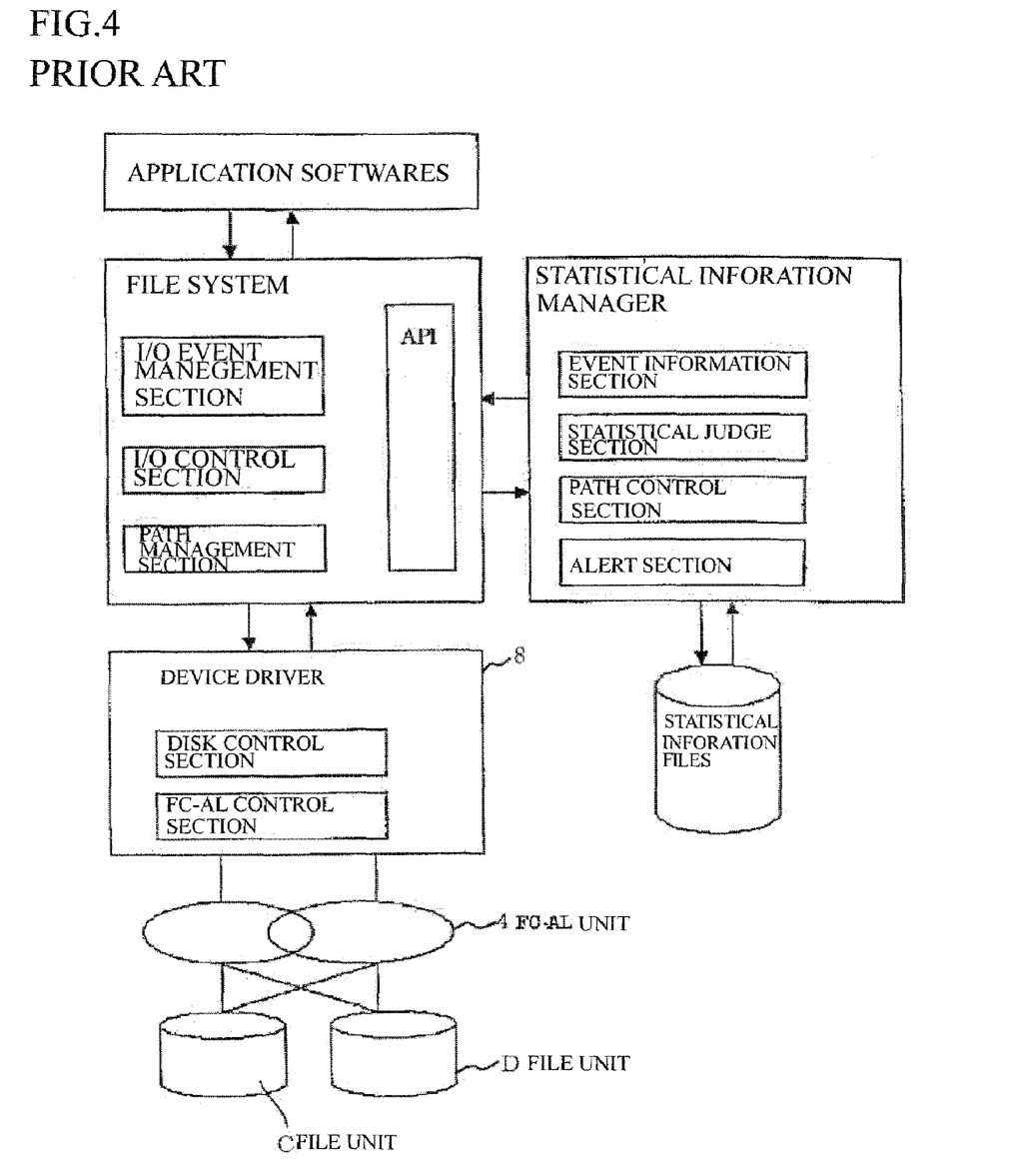
FIG. 4 is a block diagram of the conventional computer system (alternate path management system)

A conventional computer system capable of performing the multipath control is disclosed in Japanese Patent Gazette No. 2001-154929. The computer system (alternate path management system) is shown in FIG. 4, which is a block diagram. In FIG. 4, a device driver 8 of the host computer is connected to file units (storage units) C and D by an FC-AL (Fiber Channel-Arbitorated Loop) unit 4.

Figure 5:
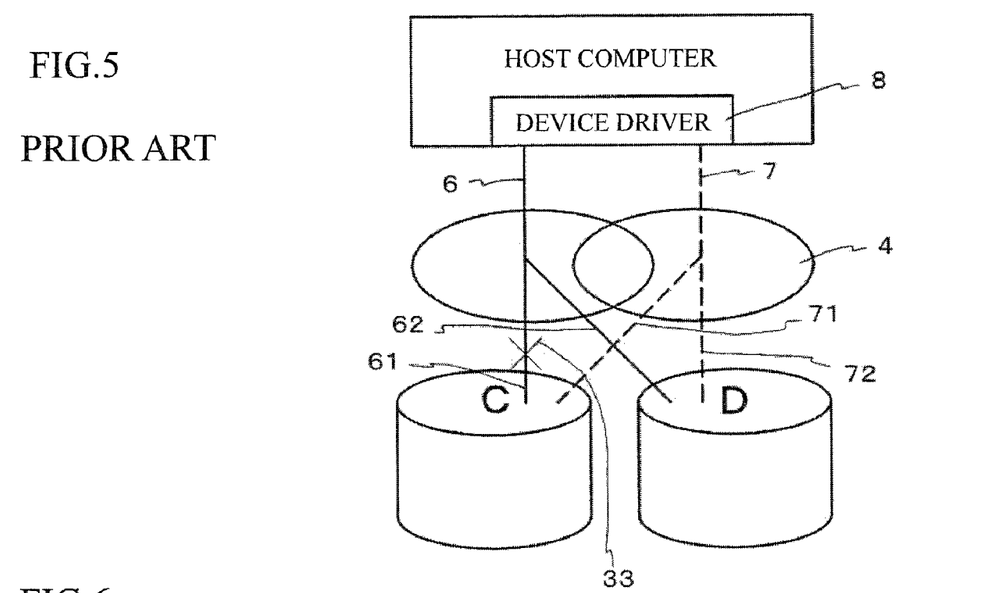
FIG. 5 is an explanation view of the paths of the conventional computer system shown in FIG. 4.

To clearly explain the computer system, a path structure of the computer system shown in FIG. 4 is shown in FIG. 5.

The FC-AL unit 4 is connected to the device driver 8 via paths 6 and 7. Paths 61 and 62, which are connected to the path 6 and the file units (storage units) C and D, are connected to the FC-AL unit 4; paths 71 and 72, which are connected to the path 7 and the file units (storage units) C and D, are connected to the FC-AL unit 4. Namely, the host computer can access to the file units C and D via the path 6 or 7. The paths 6, 61 and 62 shown by solid lines are regular paths, which are used in a normal state; the paths 7, 71 and 72 shown by dotted lines are sub paths.

When failure 33, which is shown as x in FIG. 5, occurs in the path 61 connected to the path 6 and the file unit C, the device driver 8 of the computer prohibits to access via the path (regular path) 61. Namely, it controls to access to the file unit C via the paths (sub paths) 7 and 71.

The device driver 8 repeatedly access-checks a part of storage area of the file unit C, via the paths 6 an 61, at regular time intervals. If an error is detected by the access check, the access via the path 61 is continuously prohibited. On the other hand, if no error is detected by the access check or the failure in the path 61 is resolved, the access to the file unit C is allowed via the regular paths 6 and 61 again.

Especially, in a computer system including a plurality of storage units, a virtual storage unit, which is constituted by combining storage areas of physical storage units and recognized as a storage area by a host computer, was proposed.

Figure 6:
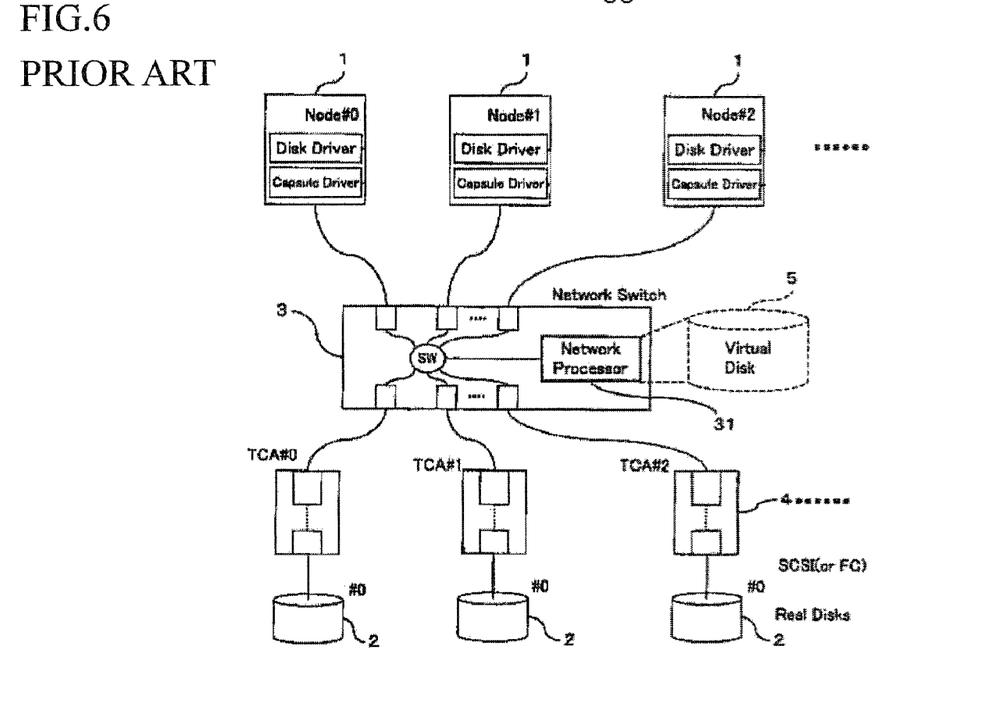
FIG. 6 is a block diagram of the conventional computer system (storage virtualizing system)

An example of the computer system employing the virtual storage unit is disclosed in Japanese Patent Gazette No. 2003-44421. The computer system is shown in FIG. 6. A plurality of node units (host computers) 1 and a plurality of storage units 2 are connected by a network switch 3. A network processor 31 of the network switch 3 combines a part or a whole of a storage area of each storage unit 2 so as to constitute a virtual storage unit (virtual common disk) 5. The node units 1 are capable of accessing to the virtual storage unit 5.

By the virtualization of the storage, a user can optionally produce the virtual storage unit on the basis of uses of the host computer. By accessing to the virtual storage unit, the host computer can use the physical storage units without regard to storage capacities and connection types of the physical storage units.

The multipath control may be applied to the virtual storage unit.

Figure 7:
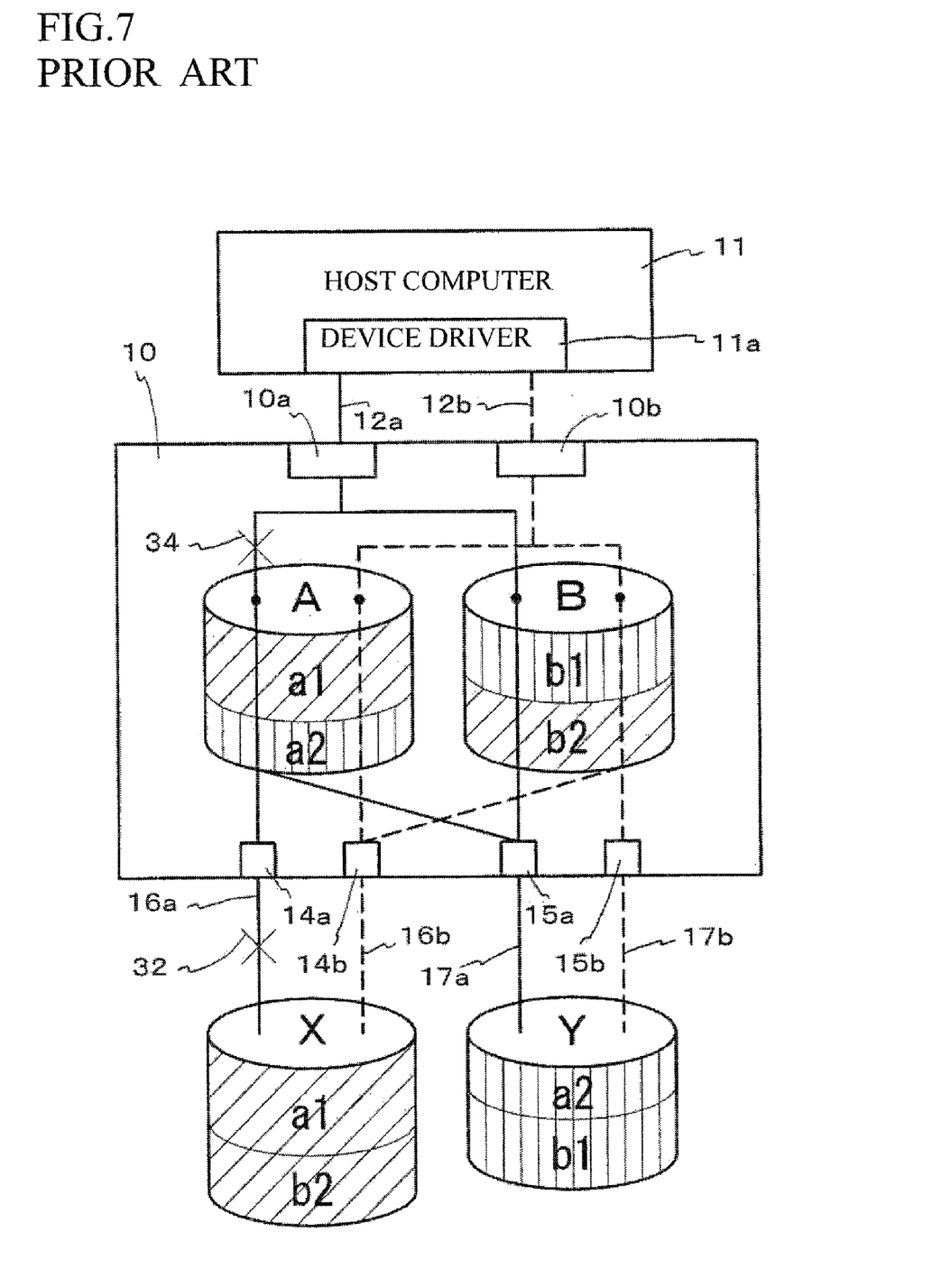
FIG. 7 is a block diagram of the conventional computer system performing multipath control and virtualizing storages.

A conventional computer system, which provides a virtual storage unit to a host computer performing the multipath control, is shown in FIG. 7. The computer system comprises: a storage virtualizer 10 having a regular target 10a and a sub target 10b; a host computer 11 being connected to the targets 10a and 10b by a regular path 12a and a sub path 12b; and physical storage units X and Y being respectively connected to the storage virtualizer 10 by regular paths and sub paths (16a, 16b) and (17a, 17b).

The storage virtualizer 10 produces one or a plurality of virtual storage units A and B, which are constituted by combining a part or a whole storage area of one or a plurality of physical storage units X and Y. The host computer 11 is capable of accessing to the virtual storage units A and B via the regular target 10a and the sub target 10b.

In FIG. 7, the storage virtualizer 10 produces the virtual storage unit A by combining a part a1 (upper part in FIG. 7) of the physical storage unit X and a part a2 (upper part in FIG. 7) of the physical storage unit Y; the storage virtualizer 10 produces the virtual storage unit B by combining a part b1 (lower part in FIG. 7) of the physical storage unit Y and a part b2 (lower part in FIG. 7) of the physical storage unit X. The host computer 11 is capable of accessing to the virtual storage units A and B via the targets 10a and 10b. Note that, the structure of the virtual storage units, which is produced by the storage virtualizer 10, is not limited to the example shown in FIG. 7. For example, a part or a whole storage areas of many physical storage units, which are connected to the storage virtualizer 10, may be optionally combined to constitute a virtual storage unit.

In FIG. 7, the paths and access routes shown by solid lines indicate the regular paths and regular access routes; the paths and access routes shown by dotted lines indicate the sub paths and sub access routes. As shown in FIG. 7, connecting means (14a, 14b) and (15a, 15b) make the regular paths 16a and 17a of the physical storage units X and Y correspond to the regular target 10a and make the sub paths 16b and 17b correspond to the sub target 10b. Namely, when the host computer 11 accesses via the regular path 12a and the regular target 10a, the host computer 11 real-accesses to the physical storage unit X and Y via the connecting means 14a and 15a corresponding to the target 10a and the regular paths 16a and 17a. On the other hand, when the host computer 11 accesses via the sub path 12b and the sub target 10b, the host computer 11 real-accesses to the physical storage unit X and Y via the connecting means 14b and 15b corresponding to the target 10b and the sub paths 16b and 17b.

Note that, in the specification of the present application, an access to a physical storage unit is called "real access" so as to distinguish from an access to a virtual storage unit.

In the computer system shown in FIG. 7, the host computer 11 (a device driver 11a) is capable of accessing to the virtual storage units A and B, without regarding as "virtual" storage units, as well as the access to the file units (physical storage units) C and D shown in FIG. 5.

However, the conventional computer system shown in FIG. 7, which virtualizer the storage units and performs the multipath control, has following problems.

In FIG. 7, when failure 32, which is shown as x, occurs in the path 16a connecting the physical storage unit X to the storage virtualizer 10, if the host computer 11 accesses to the storage area a1 of the virtual storage unit A via the regular path 12a (regular target 10a), an error signal is sent to the host computer 11 due to the failure 32 in the path 16a.

Therefore, the device driver 11a of the host computer 11 recognizes that failure 34, which is shown as x, occurs in the access route to the virtual storage unit A via the path 12a (target 10a). Then, the access to the virtual storage unit A via the path 12a is prohibited, but the access to the virtual storage unit A via the sub path 12b (target 10b) is allowed.

The device driver 11a access-checks a part of the storage area of the virtual storage unit A via the path 12a at regular time intervals. If an error is detected by the access check, the access via the path 12a is continuously prohibited. On the other hand, no error is detected by the access check, the device driver 11a recognizes that the failure 34 in the path 12a is resolved and allows the access to the file unit C via the regular path 12a again.

Since the device driver 11a of the host computer 11 recognizes the virtual storage unit A as one storage unit, a part of the storage area a2 may be assigned as an area to be access-checked. In this case, the access to the storage area a2 of the virtual storage unit A is performed via the path 17a, and the access is not performed via the path 16a, in which the failure 32 actually occurs, so that the access can be normally performed. By normally performing the access check, the device driver 11a judges that the failure 34 recognized by the device driver 11a has been resolved. Then, the access to the virtual storage unit A is performed via the regular path 12a.

However, if the host computer 11 accesses to the storage area a1 of the virtual storage unit A via the path 12a, the error occurs again due to the failure 32 in the path 16a. Therefore, the host computer 11 and the device driver 11a repeat the above described action. Namely, switching the path between the regular path 12a and the sub path 12b is repeated, so that the host computer 11 cannot rapidly access to the virtual storage unit A.

SUMMARY OF THE INVENTION

The present invention was conceived to solve the above described problems.

An object of the present invention is to provide a storage virtualizer, which will be connected to a host computer performing multipath control and which does not repeatedly switch a path used by the host computer when failure occurs in a path between a physical storage unit and the virtual storage unit.

Another object is to provide a computer system using the storage virtualizer of the present invention.

To achieve the objects, the present invention has following structures.

Namely, the storage virtualizer of the present invention comprises: a plurality of targets being connectable to a host computer; means for connecting at least one physical storage unit to the targets via a plurality of paths; virtualization means producing at least one virtual storage unit by at least a part of a storage area of the physical storage unit and allowing the host computer to access to the virtual storage unit, the virtualization means real-accessing to the physical storage unit via the path corresponding to the target accessed when the access is executed; means for detecting failure of real access to the physical storage via each of the paths; and target control means blocking the target corresponding to the failure path, which is detected by the detecting means, with respect to the host computer.

With this structure, even if failure occurs in the path between the storage virtualizer and the physical storage unit, the target corresponding to the failed path is blocked with respect to the host computer. Therefore, normal termination of an access check of the host computer can be prevented before resolving the failure, so that frequent switching of the path used by the host computer can be prevented.

In the virtualizer, the target control means may exceptionally block none of the targets or release the block of all of the targets when the detecting means detects the failure in all of the paths connected to the physical storage unit.

In this case, if failure occurs in all of the paths connected to the physical storage unit due to trouble of the physical storage unit, etc. and all of the targets corresponding to the paths are blocked, the host computer cannot access to the virtual storage unit, and functions of the host computer are remarkably impaired. Thus, the block is not performed or is released exceptionally, so that the host computer can access to a storage area, which can be normally accessed, and remarkable functional failure of a system can be prevented.

In the virtualizer, the detecting means may include path check means for checking if the failure occurs in the path or not in answer to a command sent from the host computer, and the target control means may execute the block and the release on the basis of a result of the check performed by the path check means.

With this structure, the block and the release of the targets can be control on the basis of occurring the failure in the path and recovering the failure.

The computer system of the present invention comprises: the above described storage virtualizer; and the host computer, the host computer is connected to the storage virtualizer via the targets thereof and multipath-controls the virtual storage unit, and the virtual storage unit includes the physical storage unit, which is connected to the targets, by the connecting means, via the paths.

With this structure, even if failure occurs in the path between the storage virtualizer and the physical storage unit, the target corresponding to the failed path is blocked with respect to the host computer. Therefore, normal termination of an access check of the host computer can be prevented before resolving the failure, so that frequent switching of the path used by the host computer can be prevented.

The virtualizer may further comprises communication means for communicating with another multinode storage virtualizer, the communication means sending and receiving a datum, which indicates whether failure of real access, via paths connecting the another multimode storage virtualizer to the physical storage unit, occurs or not, and the target control means may exceptionally block none of the targets or release the block of all of the targets when the detecting means detects the failure in all of the paths connected to the physical storage unit and the datum, which indicates the failure occurring in all of the paths connecting the another multimode storage virtualizer to the physical storage unit, is received by the communication means.

With this structure, a plurality of the storage virtualizers are multinodely provided. The target control means can control the block and the release of the targets by checking if all of the paths including the paths of another storage virtualilzer are failed or not.

In the virtualizer, the detecting means may include path check means for checking if the failure occurs in the path or not in answer to a command sent from the host computer and checking if the failure of the real access occurs in the paths connecting the another multimode storage virtualizer to the physical storage unit or not by the communication means, and the target control means may execute the block and the release on the basis of results of the checks performed by path check means.

With this structure, the block and the release of the targets can be control on the basis of occurring the failure in the path and recovering the failure.

Further, another computer system comprises: a plurality of the above described storage virtualizeres; and the host computer, the host computer is connected to the storage virtualizeres via the targets thereof and multipath-controls the virtual storage units, each of the virtual storage units includes the physical storage unit, which is connected to the targets, by the connecting means, via the paths, and the storage virtualizeres are arranged as multinod and mutually send and receive a datum, which indicates whether failure of real access, via the paths, occurs or not, by communication means.

With this structure, the target control means of each storage virtualizer can control the block and the release of the targets by checking if all of the paths including the paths of another storage virtualilzer are failed or not.

By employing the storage virtualizer and the computer system of the present invention, even if failure occurs in the path between the storage virtualizer and the physical storage unit, the problem of frequent switching of the path used by the host computer can be prevented.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings.

First Embodiment

Figure 1:
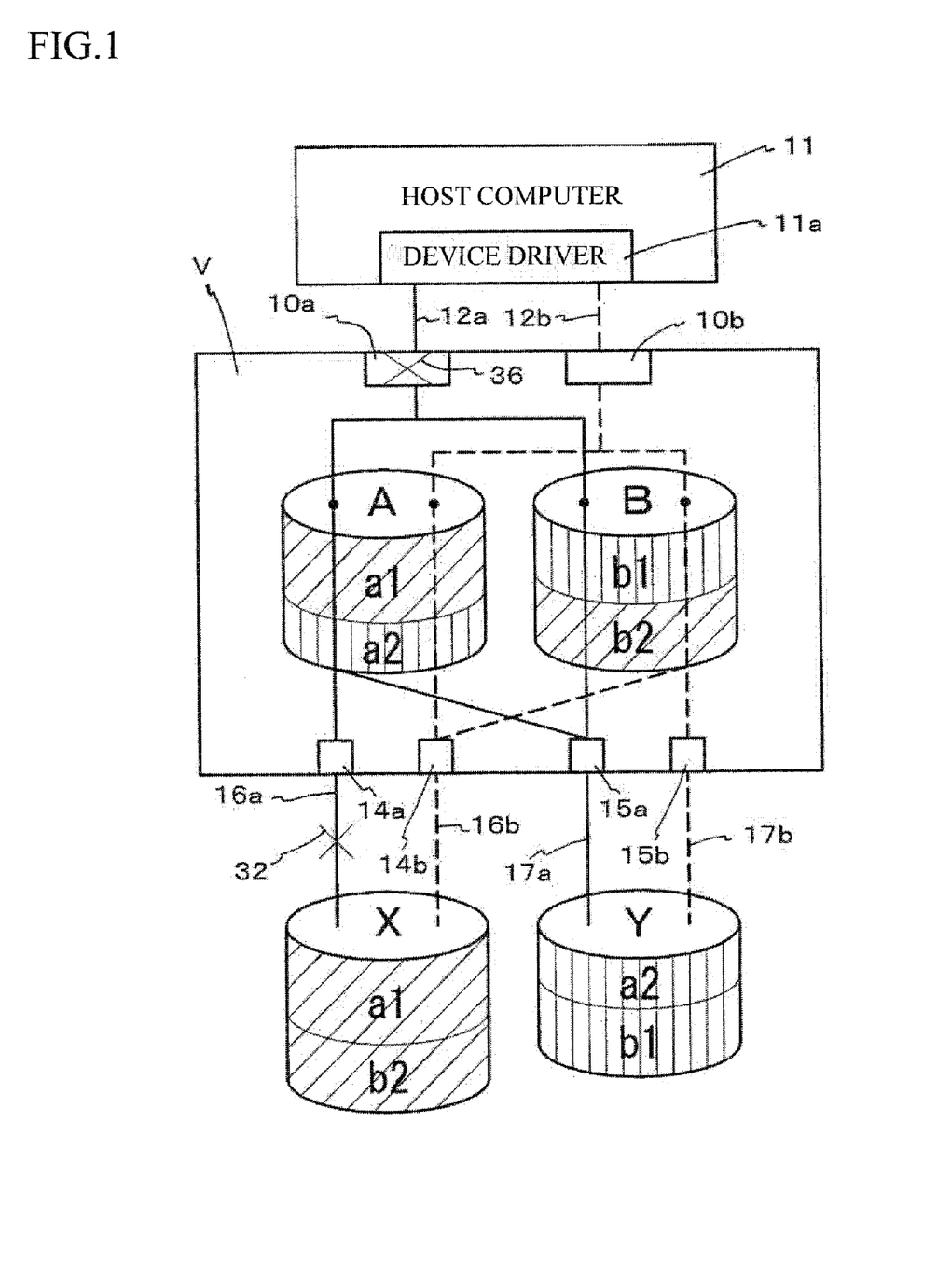
FIG. 1 is a block diagram of a computer system of a first embodiment of the present invention.

A computer system of a first embodiment is shown in FIG. 1. A basic structure of the computer system of the first embodiment is similar to that of the described conventional computer system shown in FIG. 7, so the structural elements shown in FIG. 7 are assigned the same symbols and explanation will be omitted. In the first embodiment, a storage virtualizer V is used instead of the storage virtualizer 10 shown in FIG. 7.

An example of the storage virtualizer V, which is a substantial part of the computer system of the present embodiment, will be explained.

The storage virtualizer V includes a plurality of targets, e.g., a regular target 10a and a sub target 10b, which can be connected to a host computer 11, and a plurality of connecting means (14a, 14b) and (15a, 15b), which connect a plurality of physical storage units, e.g., two units X and Y, to the targets 10a and 10b. The physical storage unit X is connected to the connecting means (14a, 14b) by a plurality of paths, e.g., paths 16a and 16b; the physical storage unit Y is connected to the connecting means (15a, 15b) by a plurality of paths, e.g., paths 17a and 17b.

The targets 10a and 10b and the connecting means (14a, 14b) and (15a, 15b) are fiber channel interfaces, and they are connected to the host computer 11 and the physical storage units X and Y by coaxial cables or fiber-optic cables, which respectively correspond to fiber channels.

Figure 2:
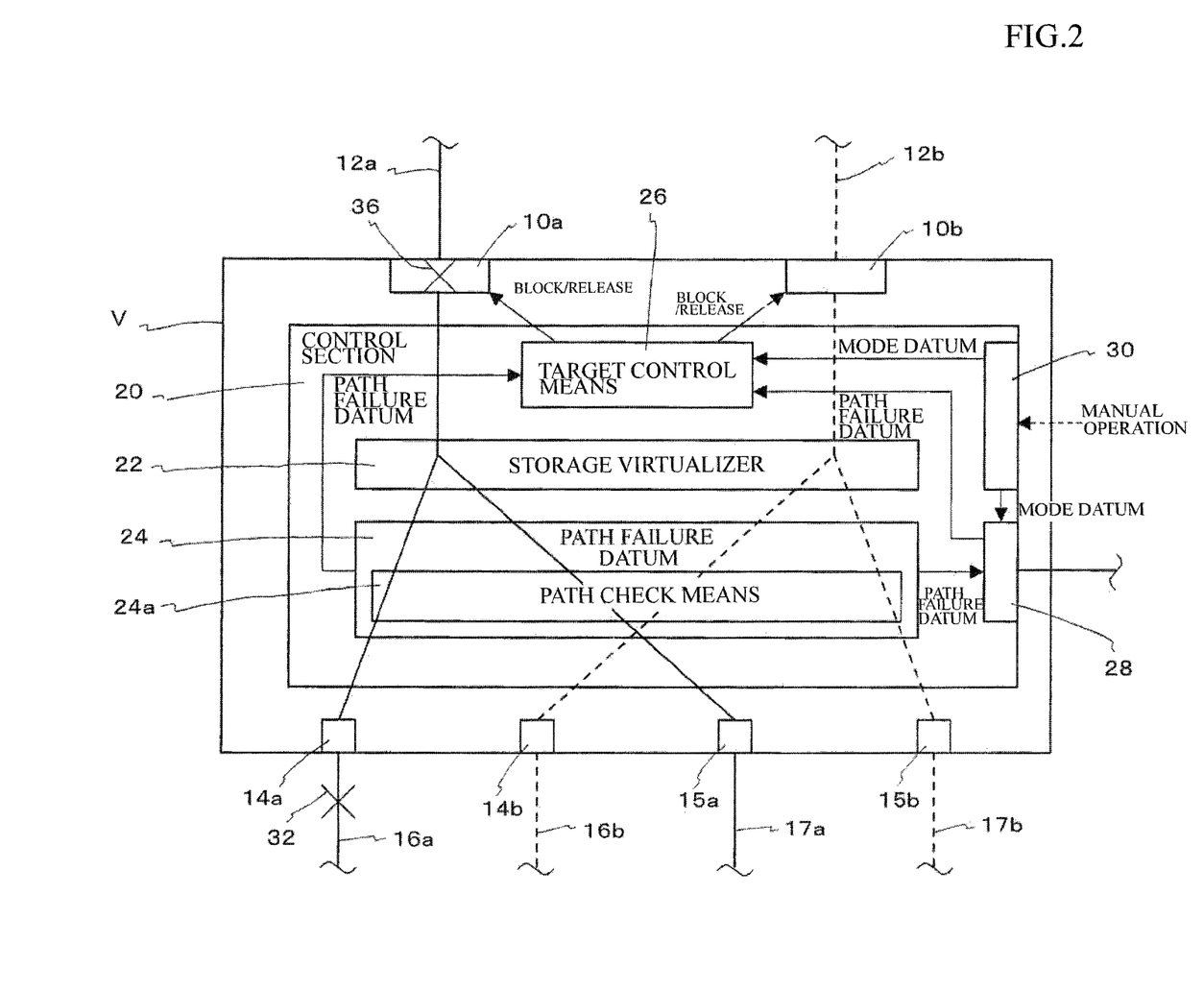
FIG. 2 is a block diagram of a storage virtualizer used in the computer systems of the first embodiment and a second embodiment.

FIG. 2 is a block diagram of the storage virtualizer V used in the computer systems of the first embodiment.

The storage virtualizer V includes a control section 20, which is constituted by a CPU, LSIs, memories, etc. . . . The control section 20 executes firmware programs stored in a ROM and functions of the LSIs so as to act as virtualization means 22, detecting means 24, path check means 24a, target control means 26, communication means 28 and mode selection means 30.

As shown in FIG. 1, the storage virtualizer V combines parts of storage areas of the physical storage units X and Y, which are respectively connected by the connecting means (14a, 14b) and (15a, 15b) so as to serve virtual storage units A and B for the host computer 11. Note that, a structure of the virtual storage unit is not limited to the present embodiment. The virtual storage unit may be produced by optionally combining a part or a whole storage area of a plurality of physical storage units connected.

The virtualization means 22 real-accesses to storage areas of the physical storage units X and Y, via the connecting means (14a, 14b) and (15a, 15b) and the paths (16a, 16b) and (17a, 17b), on the basis of signals for accessing to the virtual storage units A and B, which are inputted from the targets 10a and 10b.

The detecting means 24 checks existence of failure in the paths (16a, 16b) and (17a, 17b) when the virtualization means 22 real-accesses to the physical storage units X and Y and at regular time intervals so as to detect failure in each of the paths.

The detecting means 24 includes the path check means 24a, which checks if failure occurs in the paths (16a, 16b) and (17a, 17b) or not in answer to an access check command sent from the host computer 11.

The detecting means 24 blocks the paths (16a, 16b) and (17a, 17b) connected to the physical storage units and releases the block according to existence of failure. The wording "block a path (connected to a physical storage unit)" means to prohibit real access to the physical storage unit via the path. For example, when the storage virtualizer requests the real access via the path, an error signal is returned thereto as the "block" process.

When the detecting means 24 detects occurrence or dissolution of failure in the path, the detecting means 24 sends a signal for indicating the occurrence or the dissolution and identifying the path to the target control means 26.

The target control means 26 blocks the target corresponding to the failed path or releases the block when the target control means 26 receives the signal sent from the detecting means 24, which indicates the occurrence or the dissolution and identifying the path. For example, when a failure 32, which is shown as x, occurs in the path 16a connecting the storage virtualizer V to the physical storage unit X, the signal indicating the occurrence of the failure 32 is inputted to the target control means 26. Then, the target control means 26 blocks the target 10a corresponding to the failed path 16a. The block is shown as x 36.

Note that, the wording "block a target" means to prohibit access to the virtual storage unit via the target. For example, the target sends a busy signal to the host computer 11 or an error signal is returned to the host computer 11 in answer to an access signal sent from the host computer 11.

Further, when the detecting means 24 detects failures in all of the paths connected to one physical storage unit, the target control means 26 exceptionally blocks none of the targets or releases the block of all of the targets.

For example, when the detecting means 24 detects failures in all of the paths 16a and 16b connected to the physical storage unit X, the target control means 26 does not block the targets 10a and 10b exceptionally. When failure was detected in the path 16a only and the target 10a is being blocked, if another failure is newly detected in the path 16b, the target control means 26 releases the block of the target 10a.

In case that failures occur in all of the paths 16a and 16b connected to the physical storage unit X and the block of the targets 10a and 10b are released, if the detecting means 24, which includes the path check means 24a, detects the dissolution of the failure in one path 16a, of the target control means 26 newly blocks the target 10b corresponding to the other failed path 16b.

In the storage virtualizer V and the computer system using the storage virtualizer V, when failure occurs in the path 16a, 16b, 17a or 17b between the storage virtualizer V and the physical storage unit X and Y, the target 10a or 10b corresponding to the failed path is blocked with respect to the host computer 11. Therefore, the device driver 11a of the host computer 11 cannot perform access check to the blocked target due to busy, or error signals are sent in answer to the access check. Therefore, the host computer 11 cannot access to the virtual storage units via the blocked target. By blocking the target, the device driver 11a of the host computer 11 perform multipath control so as to access to the virtual storage units via another path, e.g., sub path.

Therefore, normal termination of the access check of the host computer 11 can be prevented before resolving the failure, so that the conventional problem, i.e., frequent switching of the path used by the host computer 11, can be solved.

When the failed path is recovered, the detecting means 24 or the path check means 24a, which responds to an access check command sent from the host computer 11, detects the dissolution of the failure, the detecting means 24 sends the signal indicating the dissolution of the failure to the target control means 26, then the target control means 26 releases the block of the target corresponding to the failed path.

With this process, the busy signal of the blocked target is stopped or a response to the access check command is back to normal. If the released target corresponds to the regular path, the host computer 11 perform, for example, the multipath control so as to use the regular path.

In the computer system of the first embodiment, when one physical storage unit X breaks down and failures are detected in all of the paths 16a and 16b connected to the physical storage unit X, if all of the targets 10a and 10b corresponding to the paths 16a and 16b are blocked, the host computer 11 cannot access to the virtual storage units so that functions of the host computer 11 are remarkably impaired. In this case, the block is not performed or is released exceptionally, so that the host computer 11 can access to a storage area, which can be normally accessed, and remarkable functional failure of the system can be prevented.

In the first embodiment, the paths (16a, 16b) and (17a, 17), which are connected to the physical storage units X and Y, will be blocked when the physical storage unit breaks down. When failures occur in all of the paths connected to one physical storage unit and the target corresponding to the paths is not blocked, use of the failed path is prohibited but other paths, in which no failures occur, can be used. For example, when failures occur in the paths 16a and 16b, the paths 16a and 16b are blocked, so the host computer 11 cannot access to the storage area a1 of the virtual storage unit A and the storage area b2 of the virtual storage unit B. But, the host computer 11 can access to other storage areas.

Since use of the failed paths connected to the physical storage unit is prohibited, reliability of the computer system can be maintained.

The present invention is not limited to the disclosure of the first embodiment. For example, the failed path connected to the physical storage unit need not be blocked. It is not always true that the access cannot be performed via the failed path. The access can sometimes succeed. Therefore, even if failures occur in all of the paths connected to one physical storage unit, the host computer 11 can try to access to the storage areas a1 and be via the failed paths, e.g., paths 16a and 16b. Therefore, choices of processes of the host computer 11 can be opened, so that remarkable functional failure of the system can be prevented.

Second Embodiment

Figure 3:
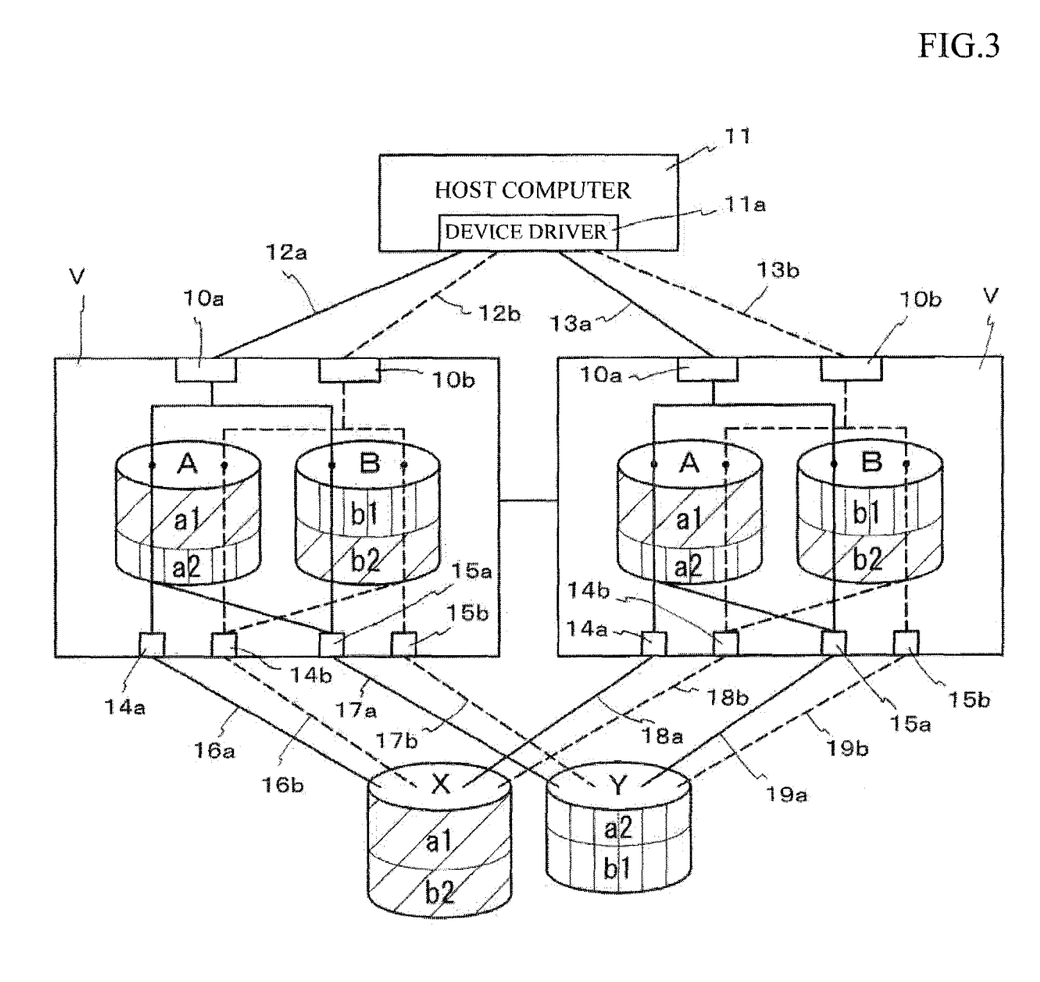
FIG. 3 is a block diagram of a computer system of the second embodiment.

FIG. 3 is a block diagram of the computer system of a second embodiment. Note that, the structural elements explained in the first embodiment are assigned the same symbols and explanation will be omitted.

The computer system of the second embodiment includes a plurality of the storage virtualizers V, each of which is the same as the storage virtualizers V of the first embodiment. Namely, two storage virtualizers V are respectively connected to the host computer 11 via the paths (12a, 12b) and (13a, 13b). The storage virtualizers V are connected to the physical storage X via the paths (16a, 16b) and (18a, 18b) and further connected to the physical storage Y via the paths (17a, 17b) and (19a, 19b). The virtualization means 22 of each storage virtualizer V produces the virtual storage units A and B. The host computer 11 is capable of accessing to the virtual storage units A and B via any of the storage virtualizers V. This structure is called "multinode".

By employing the multinode system, even if one of the storage virtualizers V breaks down, the system can be continuously operated. Failure resistance of the system can be improved.

In the computer system shown in FIG. 3, two of the storage virtualizers V are capable of communicating each other by the communication means 28 (see FIG. 2).

Two of the storage virtualizers V mutually send and receive a datum, which indicates whether failure of real access, via the paths (16a, 16), (17a, 17b) or (18a, 18b), (19a, 19b), occurs or not, by the communication means 28.

The mode selection means 30 is provided to each of the storage virtualizers V. A user can select to use one of the storage virtualizers V as well as the first embodiment or use a plurality of the storage virtualizers V as the multimode. The mode selection means 30 may be, for example, a mode selecting switch (see FIG. 2) manually operated by the user, a mode selecting function executed on the basis of a command sent from the host computer 11, etc. . . .

In the first embodiment, when the detecting means 24 detects failures in all of the paths connected to one of the physical storage units, the target control means 26 blocks none of the targets or releases the block thereof.

On the other hand, in the computer system of the second embodiment, wherein the multinode system is selected by the mode selection means 30, when the detecting means 24 detects failures in all of the paths connected to one of the physical storage units, the target control means 26 checks if failures occur in all of the paths connecting the physical storage unit to another storage virtualizer or not via the communication means 28. If the target control means 28 receives the datum indicating failures occurring in all of the paths connecting the physical storage unit to another storage virtualizer, the target control means 26 blocks none of the targets or releases the block thereof.

When the detecting means 24 including the path check means 24a detects dissolution of the failure in at least one of the paths, which are connected to one physical storage unit, while the block of the targets 10a and 10b are released due to the failures occurring in all of the paths connected to the physical storage unit, the target control means 26 newly blocks the target corresponding to the failed paths and sends the signal indicating the dissolution of the failure in the path to the other storage unit via the communication means 28.

In the other storage unit, upon receiving the signal, the target control means 28 newly blocks the target corresponding to the failed paths.

In the computer system of the second embodiment, when failures occur in all of the paths of one physical storage unit, which is connected to one storage virtualizer V, if the other storage virtualizer V is connected to the physical storage unit by normal paths, the targets of the one storage virtualizer V are blocked. Therefore, the host computer 11, which performs the multipath control, can access to the target of the other storage virtualizer V, which has the normal paths, via the normal paths.

Namely, in the multinode computer system, when failures occur in all of the paths of one physical storage unit, which is connected to one storage virtualizer V, if none of the targets are blocked as well as the first embodiment, there is possibility the host computer accesses via the failed paths, so that access efficiency and reliability of the system must be lowered. On the other hand, in the second embodiment, when failures occur in all of the paths connected to one physical storage unit, which is connected to one storage virtualizer V, if the other storage virtualizer V has normal paths connected to the physical storage unit, the block of the target is performed. With this action, the host computer 11, which performs the multipath control, can access to the target of the other storage virtualizer V, which has the normal paths.

In the first and second embodiments, the computer system has one host computer 11, one or two storage virtualizers V and two physical storage units X and Y, but the present invention is not limited to the embodiments. For example, a plurality of host computers may be provided, and many of storage virtualizers and physical storage units may be provided. In the first and second embodiments, two virtual storage units A and B, which are produced by the storage virtualization means 22 of the storage virtualizers V, are produced, but many of virtual storage units may be produced.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A storage virtualizer, comprising:
a plurality of targets being connectable to a host computer;
means for connecting at least one physical storage unit to said targets via a plurality of paths;
virtualization means producing at least one virtual storage unit by at least a part of a storage area of the physical storage unit and allowing the host computer to access to the virtual storage unit, said virtualization means real-accessing to the physical storage unit via the path corresponding to the target accessed when the access is executed;
means for detecting failure of real access to the physical storage via each of the paths;
target control means blocking the target corresponding to the failure path, which is detected by said detecting means, with respect to the host computer; and
communication means for communicating with another multimode storage virtualizer, said communication means sending and receiving a datum, which indicates whether failure of real access, via paths connecting said another multimode storage virtualizer to the physical storage unit, occurs or not,
wherein said target control means exceptionally blocks none of said targets or releases the block of all of said targets when said detecting means detects the failure in all of the paths connected to the physical storage unit and the datum, which indicates the failure occurring in all of the paths connecting said another multimode storage virtualizer to the physical storage unit, is received by said communication means.

2. The virtualizer according to claim 1, wherein said detecting means includes path check means for checking if the failure occurs in the path or not in answer to a command sent from the host computer and checking if the failure of the real access occurs in the paths connecting said another multimode storage virtualizer to the physical storage unit or not by said communication means, and
said target control means executes the block and the release on the basis of results of the checks performed by path check means.

3. The virtualizer according to claim 1, wherein said target control means exceptionally blocks none of said targets or releases the block of all of said targets when said detecting means detects the failure in all of the paths connected to the physical storage unit.

4. A computer system comprising:
a plurality of storage virtualizers; and a host computer, wherein each of the storage virtualizers comprises;
a plurality of targets being connectable to said host computer;
means for connecting at least one physical storage unit to said targets via a plurality of paths;
virtualization means producing at least one virtual storage unit by at least a part of a storage area of the physical storage unit and allowing the host computer to access to the virtual storage unit, said virtualization means real-accessing to the physical storage unit via the path corresponding to the target accessed when the access is executed;

means for detecting failure of real access to the physical storage via each of the paths;

target control means blocking the target corresponding to the failure path, which is detected by said detecting means, with respect to the host computer; and communication means for communicating with another multimode storage virtualizer, said communication means sending and receiving a datum, which indicates whether failure of real access, via paths connecting said another multimode storage virtualizer to the physical storage unit, occurs or not, wherein said target control means exceptionally blocks none of said targets or releases the block of all of said targets when said detecting means detects the failure in all of the paths connected to the physical storage unit and the datum, which indicates the failure occurring in all of the paths connecting said another multimode storage virtualizer to the physical storage unit, is received by said communication means, wherein said storage virtualizers are arranged as multimode and mutually send and receive a datum, which indicates whether failure of real access, via the paths, occurs or not, by communication means, wherein said host computer is connected to said storage virtualizers via said targets thereof and multipath-controls the virtual storage units, and wherein each of said virtual storage units includes the physical storage unit or units, which are connected to said targets, by said connecting means, via the paths.

5. The virtualizer according to claim 4, wherein said detecting means includes path check means for checking if the failure occurs in the path or not in answer to a command sent from the host computer and checking if the failure of the real access occurs in the paths connecting said another multimode storage virtualizer to the physical storage unit or not by said communication means, and said target control means executes the block and the release on the basis of results of the checks performed by path check means.

6. The virtualizer according to claim 4, wherein said target control means exceptionally blocks none of said targets or releases the block of all of said targets when said detecting means detects the failure in all of the paths connected to the physical storage unit.

* * * * *